United States Patent
Geradts et al.

(10) Patent No.: US 9,637,007 B2
(45) Date of Patent: May 2, 2017

(54) SUPPLYING ELECTRIC TRACTION MOTORS OF A RAIL VEHICLE WITH ELECTRICAL ENERGY USING A PLURALITY OF INTERNAL COMBUSTION ENGINES

(71) Applicant: Bombardier Transportation GmbH, Berlin (DE)

(72) Inventors: Karlheinz Geradts, Staufen (CH); Martin Kutschker, Dietramszell (DE)

(73) Assignee: Bombardier Transportation GmbH, Berlin (DE)

( * ) Notice: Subject to any disclaimer, the term of this patent is extended or adjusted under 35 U.S.C. 154(b) by 1 day.

(21) Appl. No.: 14/655,221

(22) PCT Filed: Jan. 2, 2014

(86) PCT No.: PCT/EP2014/050029
§ 371 (c)(1),
(2) Date: Jun. 24, 2015

(87) PCT Pub. No.: WO2014/106637
PCT Pub. Date: Jul. 10, 2014

(65) Prior Publication Data
US 2015/0343910 A1    Dec. 3, 2015

(30) Foreign Application Priority Data
Jan. 2, 2013    (DE) .......................... 10 2013 200 019

(51) Int. Cl.
*B60L 11/08*    (2006.01)
*B60L 3/00*    (2006.01)
(Continued)

(52) U.S. Cl.
CPC ............. *B60L 11/08* (2013.01); *B60L 3/0092* (2013.01); *B60L 15/007* (2013.01); *B60K 5/08* (2013.01);
(Continued)

(58) Field of Classification Search
CPC ............................... B60L 11/08; B60L 15/007
(Continued)

(56) References Cited

U.S. PATENT DOCUMENTS 7,906,862 B2 *   3/2011   Donnelly ................. B60L 7/06
                                                  290/40 C
7,944,081 B2 *   5/2011   Donnelly .............. B60L 11/123
                                                  307/9.1
(Continued)

FOREIGN PATENT DOCUMENTS

DE    102006042945 A1    4/2008
DE    102011012164 A1    8/2012
(Continued)

*Primary Examiner* — Tulsidas C Patel
*Assistant Examiner* — Charles Reid, Jr.
(74) *Attorney, Agent, or Firm* — The Webb Law Firm

(57) ABSTRACT

The invention relates to supplying electric traction motors of a rail vehicle with electrical energy. Internal combustion engine/machine combination are operated such that alternating current is generated and used for operating at least one electric traction motor, in a first operating state of the machine in a generator mode. In a second operating state of the machine, an associated machine converter supplies alternating current and drives the associated internal combustion engine, wherein at least the machine converter associated with the second electrical machine is supplied, while the associated electrical machine is in the second operating state, via an electrical DC voltage line with direct current by a rectifier associated with the first machine, wherein the
(Continued)

rectifier produces the direct current from alternating current generated by the first electrical machine.

7 Claims, 2 Drawing Sheets

(51) Int. Cl.
- *B60L 15/00* (2006.01)
- *B60K 5/08* (2006.01)
- *H02J 1/10* (2006.01)
- *H02M 1/00* (2006.01)

(52) U.S. Cl.
CPC ....... *B60L 2200/26* (2013.01); *B60L 2210/30* (2013.01); *B60L 2210/40* (2013.01); *B60L 2220/42* (2013.01); *H02J 1/108* (2013.01); *H02M 2001/008* (2013.01); *Y02T 10/645* (2013.01); *Y02T 10/648* (2013.01); *Y02T 10/70* (2013.01); *Y02T 10/7077* (2013.01); *Y02T 10/7241* (2013.01)

(58) Field of Classification Search
USPC .......................................................... 290/14
See application file for complete search history.

(56) References Cited

U.S. PATENT DOCUMENTS

| | | | |
|---|---|---|---|
| 2003/0233959 A1* | 12/2003 | Kumar | B60L 7/06 105/26.05 |
| 2005/0206331 A1* | 9/2005 | Donnelly | B60L 7/04 318/52 |
| 2006/0061307 A1* | 3/2006 | Donnelly | B60L 7/06 318/108 |
| 2006/0076171 A1* | 4/2006 | Donnelly | B60L 7/04 180/65.225 |
| 2008/0060542 A1 | 3/2008 | Bakran et al. | |
| 2008/0082247 A1 | 4/2008 | Hawkins et al. | |
| 2008/0103632 A1 | 5/2008 | Saban et al. | |
| 2011/0080040 A1* | 4/2011 | Kumar | B60L 11/123 307/9.1 |
| 2013/0333635 A1 | 12/2013 | Geradts et al. | |
| 2015/0314687 A1* | 11/2015 | Geradts | B60L 1/00 290/45 |

FOREIGN PATENT DOCUMENTS

| | | |
|---|---|---|
| WO | 2006020587 A2 | 2/2006 |
| WO | 2009077184 A1 | 6/2009 |
| WO | 2012113711 A2 | 8/2012 |

* cited by examiner

SUPPLYING ELECTRIC TRACTION MOTORS OF A RAIL VEHICLE WITH ELECTRICAL ENERGY USING A PLURALITY OF INTERNAL COMBUSTION ENGINES

CROSS-REFERENCE TO RELATED APPLICATIONS

This application is the United States national phase of International Application No. PCT/EP2014/050029 filed Jan. 2, 2014, and claims priority to German Patent Application No. 10 2013 200 019.7 filed Jan. 2, 2013, the disclosures of which are hereby incorporated in their entirety by reference.

BACKGROUND OF THE INVENTION

Field of the Invention

The invention relates to an arrangement for supplying electric traction motors in a rail vehicle with electrical energy, where the arrangement includes at least two internal combustion engines. Provided for these at least two internal combustion engines is one associated electrical machine each for the generation of electrical energy, in which the electrical machine is coupled mechanically to the internal combustion engine so as to be driven by the internal combustion engine when the electrical machine is operating in generator mode. In this manner, a first and a second internal combustion engine combination at least are formed. The at least one electric traction motor of the rail vehicle is connectable electrically with at least one electrical machine by at least one traction connection. The invention further relates to a method for supplying electric traction motors in a rail vehicle with electrical energy, in which at least two internal combustion engines are driven each in combination with an associated electrical machine so that at least a first and a second internal combustion engine combination are operated. At least a first of the electrical machines generates, in a first operating state of the machine during generator mode of the respective electrical machine driven by the internal combustion engine, alternating current used for operating at least one electric traction motor. At least a second of the electrical machines, in a second operating state of the machine, is supplied with alternating current by a second machine power converter associated with it and drives the internal combustion engine associated with it.

The rail vehicle may, for example, be a locomotive. The invention is not restricted to that, however. Rather, the rail vehicle may, for example, also be a train unit.

In the rail vehicle, the electrical energy generated by the internal combustion engines in particular is not only available for supplying the at least one traction motor but also for supplying other electrical consumers. In particular, the other electrical consumers are so called auxiliaries that while not generating traction directly may be essentially necessary particularly for the driving mode of the rail vehicle. Auxiliaries may be defined generally in that they are supplied with electrical energy from the usually available direct current link by a separate auxiliaries inverter or a plurality of dedicated auxiliaries inverters. Examples of auxiliaries are, e.g., fans and other cooling devices which cool the internal combustion engines, the traction motors and/or other devices required for the driving mode (for example, power converters). In addition, a brake assembly is required for the driving mode and therefore components of the brake assembly such as air compressor belong to the auxiliaries. Other examples of auxiliaries are a fire extinguishing system of the rail vehicle, electronic devices for controlling the operation of the rail vehicle, battery chargers, heaters required at least temporarily for the driving mode, for example, window heater of the front window, and/or lighting equipment in the driver's compartment. Optionally, differentiated from the auxiliaries can be electrical installations which are merely provided for the comfort of the passengers such as, for example, lights in the vehicle compartments. These electrical installations are usually supplied with electrical energy in trains via the so called train bus bar. The train bus bar is not linked to the direct current link via the auxiliaries inverter or another of the auxiliaries inverters but by a dedicated inverter.

Description of Related Art

As is known from prior art, the electrical energy generated by the electrical machines can be fed in this invention as well into a direct current link via at least one rectifier (hereinafter: generator rectifier, because alternating current generated by the generator is rectified). Connected to the direct current link are typically several inverters which in turn generate the alternating current on the required electrical voltage level or in the required electrical voltage range that is needed for the consumers and systems connected to the alternating voltage. Additional to the inverters, provided at their direct current side can be direct power converters and/or transformers on their alternating voltage side, in order to change the voltage level. Other electrical converters may also be connected, either directly or indirectly, to the direct current link. Furthermore, except the auxiliaries aforementioned, other electrical consumers such as, for example, electrical installations provided for the comfort of the passengers such as lighting, air-conditioner and information systems, can be supplied with electrical energy from the direct current link, for example, via another inverter than those auxiliaries required for the driving mode.

For example, connected to the direct current link are: a plurality of traction motors of the rail vehicle via one or several traction inverters; a train bus bar via an additional converter, or directly; auxiliaries required for the driving mode via an auxiliaries inverter. Furthermore, additional converters can be connected to the link, for example, for the purpose of converting to heat excess energy fed into the link during the braking of the rail vehicle. An example of such an arrangement is described in WO 2009/077184 A1.

Since in the case of the present invention, more than one internal combustion engine is provided and respectively at least one electrical machine is coupled with the internal combustion engine, it is possible that only a part of the available electrical machines generates electrical energy whereas another part of the electrical machines will simultaneously operate as motor, particularly to drive the associated internal combustion engine in idle mode. The advantage of this is that the fuel supply to the internal combustion engine can be switched off. Alternately, it is also possible that at least one of the internal combustion engines runs only at low speed and so only little electric power is generated by the associated electrical machine or machines which, e.g., does not contribute or hardly contributes to an appreciable extent to the electric power fed into the direct current link.

A plurality of internal combustion engine/machine combinations therefore enables a partial load operation of the rail vehicle, i.e., an operation in which not the maximum possible electric power is needed. Consequently, partial load operation is understood to mean an operation in which the mechanical power of only a part of the internal combustion engines suffices to provide the required electric power. In addition to a reduction of the fuel consumption of the internal combustion engines, the partial load operation also has the advantage that the noise stress on the environment is much lower. For example, four internal combustion engine/machine combinations can be provided, in which preferably every combination can be operated independently of the other combinations either in idle mode or at the optimal power point. Optionally, more than two operation modes can be set for every combination, for example, additionally to the two operating modes mentioned, one operation with medium power of the electrical machines operating as generator.

In particular, as regards the further possible features of an arrangement with several internal combustion engine/machine combinations, reference is hereby made to the international patent application with the application number PCT/EP 2012/052705 which was submitted on Feb. 16, 2012. In particular, the entire content of that application is hereby included in this application by reference.

Electrical auxiliaries provided additionally to the electric traction motors and supplied with electrical energy from the direct current link include, in particular, such auxiliaries required—as aforementioned—for the driving mode of the rail vehicle. So when the auxiliaries inverter by which these auxiliaries are connected electrically with the direct current link fails or is switched off, the driving mode cannot be continued. This applies even if the direct current link and the supply of the traction motors from the link may still be functioning.

One, several or all of the internal combustion engine/machine combinations can be switched off so that, at a given time, it will be necessary to start one or several switched-off internal combustion engine/machine combinations. Particularly the internal combustion engine of the combination must be started, for which appropriate energy is needed. In the case of the present invention, the start of at least one internal combustion engine is performed by means of the associated electrical machine in that the electrical machine drives the internal combustion engine that is coupled to it mechanically. Particularly from a defined minimum speed of the internal combustion engine, the fuel supply to the internal combustion engine can be started so that the internal combustion engine starts working by itself. From that time, the internal combustion engine is started, even if the starting process may continue until the internal combustion engine attains a speed at which it can operate permanently without load without stopping running and is ready at any time to increase its speed and also operate under load. That speed is usually referred to as idling speed. Particularly, the internal combustion engine can, from the time at which it is working by itself, no more or only additionally be driven by the associated electrical machine, and from that or a later point in time, conversely, drive the electrical machine. At idling speed, the internal combustion engine drives the electrical machine which, however, does not or only marginally supply an electrical load with energy. When the speed increases further the internal combustion engine increases the power by which the electrical machine generates alternating current so that electrical consumers can be supplied with electrical energy by the electrical machine.

Expediently, the energy for the start of at least one of the internal combustion engines is obtained from an energy store of the rail vehicle, particularly an electrical or electrochemical energy store, particularly the vehicle battery. The start of several internal combustion engines and also the frequent repetition of starting processes after turning off internal combustion engines (for example, in a partial load operation, see above) stresses the energy store of the vehicle significantly. To prevent exhaustion of the energy store, the storage capacity of energy store can be increased. However, this requires higher cost and/or an increase of the weight and construction volume of the energy store; but the energy store can also comprise units distributed in the vehicle.

It is common practice to increase the voltage level at the output of the energy store (e.g., 110 V DC) by a voltage transformer in order to provide sufficient voltage for starting the internal combustion engines. For example, a machine inverter supplied with direct voltage from the energy store and the voltage transformer, respectively, to supply the electrical machine with alternating current, is designed for a direct current of the order of 750 V or of 1 kV.

It may happen that the direct power converter fails and therefore no internal combustion engine can be started so that the rail vehicle is not in running order. This can be prevented in that at least one second, redundant voltage transformer is provided. However, this again increases the manufacturing cost, the construction volume and the weight.

SUMMARY OF THE INVENTION

It is an object of the present invention to keep the expenditure of starting the internal combustion engines low in an arrangement for supplying electric traction motors in a rail vehicle with a plurality of internal combustion engines.

According to a basic concept of the present invention, an internal combustion engine/machine combination already started or operating is used for starting at least one other internal combustion engine/machine combination. In particular, alternating current generated by the first, already running combination, i.e., by the first electrical machine, is conducted to the second electrical machine of the still unstarted combination in order to drive the second electrical machine and thereby to start the internal combustion engine of the second combination. The same procedure can be applied when in the further process of starting or during any other operation of the second combination there is or emerges a need to supply electrical energy to the second electrical machine. This can be the case particularly when the internal combustion engine is to operate in idle (that is, at idling speed) with reduced fuel supply or turned off fuel supply. This can also be the case when the operation of the second internal combustion engine is disturbed and therefore the second electrical machine drives the second internal combustion engine, for example, to avoid an undesirable downtime of the second internal combustion engine.

Associated particularly to both the first and also the second electrical machine each is a machine power converter the alternating current side of which is connected electrically to the associated electrical machine. Each of the machine power converters has a direct current side with the direct current sides of the machine power converter being connected electrically with each other by a direct current connection (i.e., a line). Particularly the direct current sides of the machine power converters are therefore connected with each other directly, without additional power converters (e.g., voltage transformers).

In preferred embodiment at least one of the machine power converters and preferably all machine power converters whose direct current sides are connected with each other directly by a direct current line, is or are connected to an electrical capacitance (e.g., a capacitor or an array of capacitors). One connection of the capacitance is connected to the first potential of the direct current connection of the machine power converter and the second, opposite connection of the capacitance is connected to the second potential of the direct current connection of the machine power converter.

Preferably each of the direct current sides of the machine power converters is coupled to a capacitance in this way. The advantage of this is that fluctuations of the direct current are compensated. But already a single capacitance the poles of which are connected to the two potentials of the direct current line results in smoothing direct current fluctuations. Furthermore, the advantage of such a capacitance or the plurality of such capacitances is that electrical energy is stored in them as soon as the capacitance is charged. For the process of supplying the machine power converters with electrical energy amongst each other is that temporarily a higher power for starting or operating at least one of the internal combustion engine/machine combinations is available. For example, the capacitance or the plurality of capacitances can be charged before during and/or after the start of the first internal combustion engine/machine combination and the second internal combustion engine/machine combination only started after that.

Particularly more than two internal combustion engine/machine combinations can be provided, the electrical machines of which are coupled with each other or can be operated in the way described for two combinations above (that is, the direct current sides of the machine power converters are connected with each other). Furthermore, it is therefore possible that after the start or during operation of at least one of the combinations that combination supplies or these combinations supply energy for the start and/or operation of the other combinations.

The invention has the advantage that the energy store of the vehicle is stressed less because it is merely needed for the start of the first combination. Besides, the reliability of the rail vehicles is improved even if a redundant voltage transformer for transforming the voltage level is not absolutely required at the output of the energy store.

Particularly if, as usual, the electrical machines of the combinations are to feed electrical energy via at least one rectifier in a direct current link of the vehicle, the additional machine power converters, which are connected with each other by the direct current connection, are preferred and thereby weight and volume are saved. The reason for it is that the at least one rectifier between the electrical machines and the direct current link is designed for very high power and therefore needs correspondingly high weight and volume. If the rectifier Is additionally to be used as Inverter, the weight and volume become larger. In contrast with that, the additional machine power converters, particularly in the case of the at least one additional electrical capacitance, are designed for relatively low electric power. Therefore, the additional expenditure for the machine power converters is low.

In order to operate particularly an arrangement with direct current link, at least one rectifier between the electrical machines and the direct current circuit and additional machine power converters, in advantageous manner, optionally electrical switches are provided which, actuated by a control arrangement, can be opened and closed. This makes it possible to separate at least one of the machine power converters from the other machine power converters electrically (in this case, at least one electrical switch is provided in the direct current connection or is provided at the connection of the machine power converter to the direct current connection) and/or to separate at least one of the machine power converters from the electrical machine associated with it (in that case, the additional electrical switch is provided in the connection between the alternating voltage side of the machine power converter and the electrical machine). Alternately or additionally, an electrical switch can be provided by which the at least one rectifier or one of the rectifiers (also referred to as generator-rectifier) can be separated from the associated electrical machine or machines and/or the direct current link.

Preferably an electrical machine, while supplying energy (particularly for the starting procedure of an internal combustion engines of another combination), via the direct current connection, to an electrical machine of another combination, is separated electrically from the direct current link. Expressed more generally, the supply of at least one electrical machine via the direct current connection occurs without the use of the direct current link.

Expressed even more generally, it need not necessarily be a direct current link via which the electrical machines supply energy for the traction motor or the traction motors. Generally, therefore, in the following reference will also be made to a traction connection by which a traction motor of the rail vehicle is supplied. In that generalized case, the electrical machine therefore, while supplying energy (particularly for the starting procedure of an internal combustion engine of another combination), via the direct current connection, to an electrical machine of another combination, preferably supplies no traction motor with electrical energy. For example, an electrical switch that is opened is provided either between the electrical machine and the traction connection or between the traction connection and the traction motor. Particularly, this means that the direct current connection of the direct current sides of the machine power converters is separated, at least during that phase of operation (and preferably always), from the traction motor or traction motors such that no energy is supplied from the direct current connection to a traction motor.

Particularly, the rectifier function of at least one of the machine rectifiers to provide direct current energy for at least one other machine power converter is obtained in that, anti-parallel with the controllable electronic switches of the machine rectifier which make the inverter function possible, at least one electrical one-way valve each (particularly a diode) is provided. Such a diode is particularly commonly referred to as flywheel diode. The electrical one-way valves are preferably designed such that they can conduct the electric current required for supplying other internal combustion engine/machine combinations.

In particular, the following is proposed: An arrangement for supplying electric traction motors in a rail vehicle with electrical energy, in which the arrangement comprises:
at least two internal combustion engines,
for the at least two internal combustion engines each an associated electrical machine for generating electrical energy, in which the electrical machine is coupled mechanically with the internal combustion engine so that when the electrical machine operates in a generator operation it is driven by the internal combustion engine so that at least one first and one second internal combustion engine/machine combination are formed,
at least one electrical traction connection by which a traction motor of the rail vehicle is connectable electrically to at least one of the electrical machines,
for the electrical machines each an associated machine power converter for supplying the electrical machine with electrical energy during a motor operation of the electrical machine, in which an alternating voltage connection of the machine power converter is connected with the electrical machine, and a control arrangement for controlling at least the operation of the machine power converter, in which a first of the electrical machines is connected electrically with an alternating voltage connection of a rectifier, in which a direct current connection of the rectifier is connected electrically, via an electrical direct current line, with a direct current side of a second of the machine power converters that is associated with a second of the electrical machines, in which the rectifier rectifies the electrical alternating current generated by the first electrical machine and, via the direct current line, feeds it to the second machine power converter, and the control arrangement is embodied such that it operates the second machine power converter as inverter to supply a second electrical machine with alternating current while the second machine power converter is supplied with direct current by the rectifier.

It is conceivable that additionally to the first machine power converter that is associated with the first electrical machine, a rectifier is provided which rectifies the alternating current from the first electrical machine and feeds it to the second machine power converter. This is not preferred, however, as it means less expenditure also to design the first machine power converter as suitable rectifier.

Further, it is proposed: A method for supplying electric traction motors in a rail vehicle with electrical energy, in which:

at least two internal combustion engines each are operated in combination with an associated electrical machine so that at least a first and a second internal combustion engine/machine combination are operated, at least one first of the electrical machines in a first operating state of the machine during a generator operation of the respective electrical machine, driven by the internal combustion engine, generates alternating current used for operating at least one electric traction motor, at least a second of the electrical machines in a second operating state of the machine is supplied with alternating current by a machine power converter associated with it and drives the internal combustion engine associated with it, in which at least the machine power converter associated with the second electrical machine, while the associated electrical machine is in the second operating state, is supplied with direct current by a first rectifier associated with the first electrical machine, in which the rectifier generates the direct current from alternating current that is generated by the first electrical machine.

Both the arrangement defined previously and the method defined previously allow, in the presence of more than one internal combustion engine/machine combination, not only to supply one of the machine power converters with direct current rectified from alternating current by the electrical machine of another combination. Much more, a plurality of the machine power converters can also be supplied with direct current that is rectified at least from alternating current of the electrical machine of another of the combinations. Furthermore, it is also possible to supply one or several machine power converters of one or several other combinations with rectified alternating current from a plurality of the electrical machines.

In particular, the direct current line (preferably able to be separated electrically by at least one electrical switch) is connected to an electrical connection via which, when the vehicle is in operation, an electrical or electro-chemical energy store (particularly a vehicle battery) of the vehicle can feed electrical energy in the direct current line.

The direct current line can therefore be used particularly for starting at least one of the internal combustion engines. In that case, the energy store feeds electrical energy in the direct current line and that electrical energy can be used for starting the internal combustion engine in that the machine power converter generates alternating current and the electrical machine of the combination is driven by it.

Alternately or additionally, the electrical energy from the energy store of the vehicle can be used for charging an electrical capacitance the poles of which are connected between the potentials of the direct current line.

The term "first operating state" used above in each case refers to the electrical machine of a certain combination and to the combination, respectively. This also refers to the term "second operating state". Other operating states can occur, for example, standstill of the internal combustion engine. In the first operating state, the electrical machine is driven by the associated internal combustion engine and generates an electric alternating voltage so that an alternating current can flow. In the second operating state, the electrical machine drives the associated internal combustion engine while being supplied with alternating current from the associated machine power converter (also referred to as machine inverter). This means that with several internal combustion engine/machine combinations the different electrical machines and combinations, respectively, can be in different operating states at a time. Whereas, for example, the electrical machine of the first combination is in the first operating state, for example, the machine of the second combination is in the second operating state. However, it is not excluded that all electrical machines may be in the same operating state at a given time. If that operating state is the second operating state, energy for the operation of the electrical machines can be fed to consumers particularly via a direct current link of the arrangement. This also applies when none or not all the electrical machines are in the second in the operating state. The energy from the direct current link for supplying the electrical machine(s) can, for example, during a braking process of the rail vehicle, be generated as alternating current by the at least one traction motor and be fed into the direct current link via the associated traction inverter.

The traction connection can, in particular, be an alternating voltage connection at the alternating voltage side of the traction inverter or the direct current connection of the traction inverter. It is preferred, as will be explained in greater detail below, that the electrical machines feed the alternating current generated by them at least to one rectifier (generator rectifier) and the current rectified by the rectifier is fed into a direct current link. Connected to that direct current link is in known manner at least one traction inverter.

It is conceivable that at least one of the machine power converters also forms the generator rectifier. This is not preferred, however, particularly not for the reasons already given.

Preferably, therefore, the arrangement provides, in addition to the machine power converters, at least one generator rectifier for rectifying alternating currents generated by the electrical machines during a generator mode of the respective electrical machine, in which the at least one generator rectifier, at its alternating voltage side, is connected with at least one of the electrical machines and, at its direct current side, with a direct current link by which the electrical traction motor is suppliable with electrical energy. With regard to the method, corresponding to it is to rectify the alternating current generated by at least one generator rectifier in the first operating state of the electrical machine or the electrical machines, provided additionally to the machine power converters, and to feed it into a direct current link, from which the at least one electrical traction motor is supplied with electrical energy.

Particularly, at first, at least one electrical capacitance connected between the electrical potentials of the direct current link can be charged with electrical energy, otherwise thereafter the generated alternating current fed into the direct current link by the at least one generator rectifier. This makes it possible, particularly from the switched-off state of all internal combustion engines, at first to start one of the internal combustion engines and then to supply the direct current link with energy from the associated electrical machine without generating exceedingly high electric currents in the direct current link.

Alternately it is possible to feed energy from the electrical machine into the direct current link already during the starting process of the first internal combustion engine, when the latter is still running at low speed and therefore the alternating voltage generated by the associated electrical machine is still low. In that case, the current in the direct current link is limited by the still low alternating voltage and the capacitance in the direct current link is charged slowly. Also in this case it is preferred however that the rectifier by which the electrical machine is connected with the direct current link does not feed direct current into the direct current link at the beginning of the starting process. The reason for that is that at the beginning of the starting process the machine power converter should supply high alternating voltage for the operation of the electrical machine. This in turn would lead to high currents in the direct current link and, in addition, the performance of the machine power converter available for the starting process would be reduced.

Particularly, the control arrangement can comprise a plurality of control units, which is designed to control the power converters and optionally additional contrivances of the supply arrangement. For example, control units are provided, particularly for each of the power converters (generator rectifier, machine power converter, auxiliaries inverter, traction inverter), for the internal combustion engines and optionally for the aforementioned controllable electrical switches. Preferably, for control purposes, the control units are connected amongst each other and/or to a higher-level control unit.

According to the invention, the machine power converters are controlled particularly by the aforementioned control arrangement such that they allow the starting and/or driving of at least one of the internal combustion engines by the associated electrical machine, in which the associated electrical machine receives energy from another electrical machine of one of the combinations. For example, when two machine power converters are involved in this type of operation, the first machine power converter rectifies an alternating current generated by the associated first electrical machine and feeds that alternating current to the second machine power converter, which inverts it and so supplies the second electrical machine. In this process, the first machine power converter is preferably not controlled actively, i.e., the control for turning electronic switches on and off during the inverter operation of the machine power converter does not take place, otherwise the alternating current is rectified passively, i.e., for example, by means of the aforementioned electrical one-way valves (for example, diodes). For example, the electrical one-way valves form a three-phase half-bridge transition. On the other hand, the second machine power converter which inverts the direct current from the first machine power converter is preferably controlled actively in that particularly its electronic switches are turned on and off.

Particularly, at first, at least one electrical capacitance connected between the electrical potentials of the direct current line is charged with electrical energy, and only after that an electrical machine with rectified direct current from the direct current line and/or from the at least one capacitance (that is, with alternating current). The advantage of this is that more energy is available for supplying the electrical machine(s) from the direct current line and fluctuations of the voltage of the direct current line are smoothed. This is of advantage particularly when starting the first internal combustion engine with energy from the energy store of the vehicle.

BRIEF DESCRIPTION OF THE DRAWINGS

Examples of embodiments of the invention will now be described with reference to the accompanying drawing. The different figures in the drawing illustrate.

Figure 1:
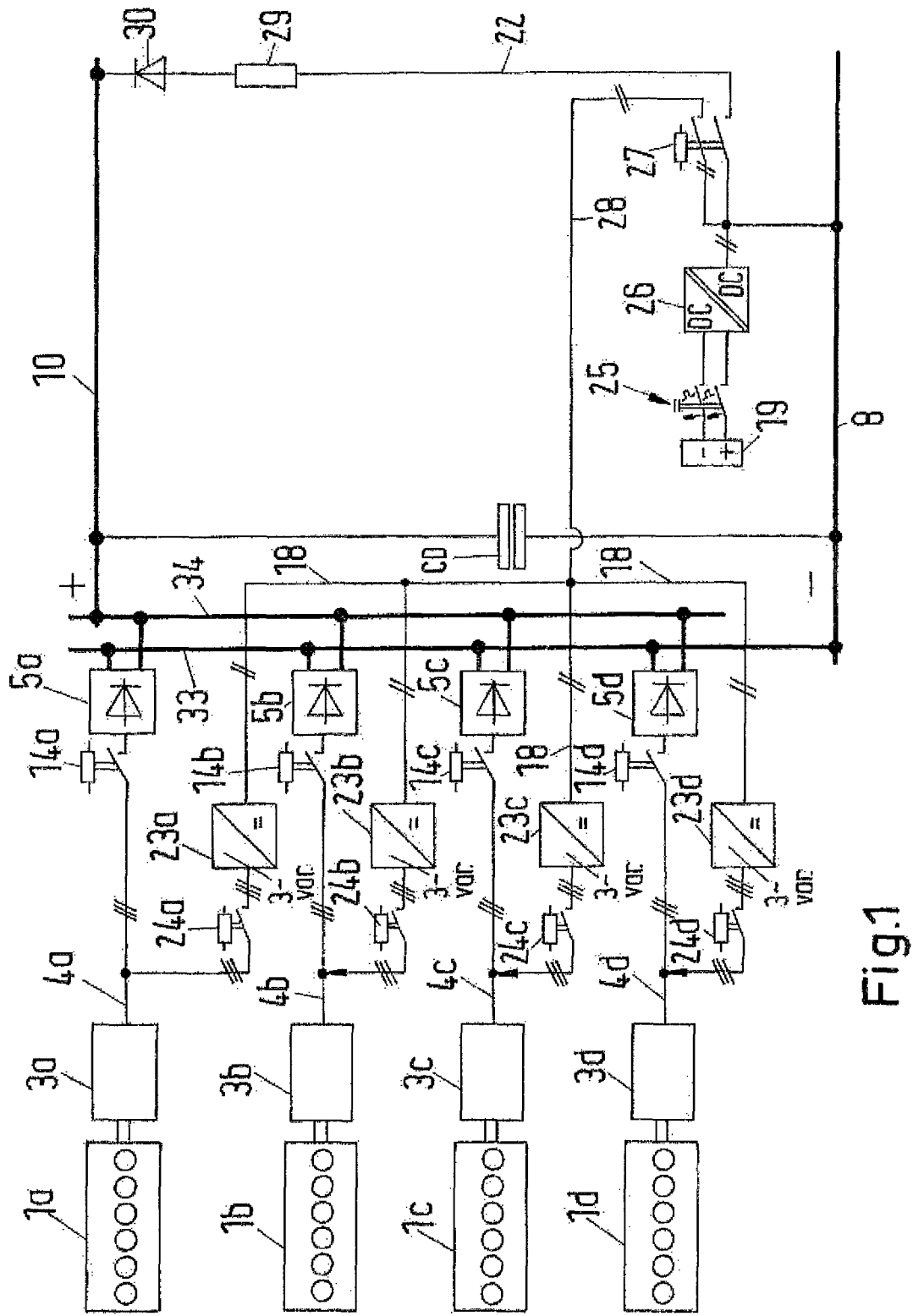
FIG. 1 one embodiment of an arrangement for supplying at least one traction motor in a rail vehicle with electrical energy, and FIG. 2 a machine power converter and a machine connected electrically to the alternating voltage side of the power converter, in which the power converter is also operable as rectifier in order to rectify alternating current generated by the electrical machine and to feed it into a direct current line.

The example of the embodiment illustrated in FIG. 1 comprises four Internal combustion engine/machine combinations 1, 3, in which the internal combustion engines 1 $a$, 1 $b$, 1 $c$, 1 $d$ are preferably Diesel engines. The electrical machines 3$a$, 3$b$, 3$c$, 3$d$ are, for example, permanent magnet synchronous motors.

DETAILED DESCRIPTION OF THE INVENTION

Each of the combinations 1, 3 is connected with a generator rectifier 5$a$, 5$b$, 5$c$, 5$d$ associated with one of the combination by a three-phase connecting line 4$a$, 4$b$, 4$c$, 4$d$. Therein, the three-phase connecting line 4 of each of the combinations is routed via a controllable three-phase disconnector 14$a$, 14$b$, 14$c$, 14$d$. In this way, the three-phase electrical connection between the electrical machine 3 and the generator rectifier 5 can be interrupted in controlled manner by a control unit (not seen in the illustration), particularly when the electrical machine 3 of the combination 1, 3 is operated as motor but also during a starting process of the combination 1, 3. The rectifiers 5 are connected to the direct current link by lines 8, 10 via connecting lines 33, 34, designed as bus line for all rectifiers 5.

Not shown in the illustration are inverters which are connected to the lines 8, 10, for example, at least one traction inverter, one auxiliaries inverter and one inverter for the power supply of the train.

Provided for each of the combinations is an associated machine inverter 23$a$, 23$b$, 23$c$, 23$d$. The alternating voltage sides of the machine inverter 23 each are connected to the three-phase connecting line 4 of the combination by a switch 24$a$, 24$b$, 24$c$, 24$d$ controllable by a control unit (not shown in the illustration).

A capacitance CD is connected between the lines 8, 10 of the link in known manner to compensate fluctuations of the direct current and/or take up energy.

Furthermore, the direct current sides of the machine inverters 23 are connected with each other by a direct current connection 18. In FIG. 1, the direct current connection 18 is illustrated by individual lines even if the connection is a two-pole connection. However, it is possible that the direct current sides are connected, for example, by a single-core electrical line and, additionally, by vehicle ground. As there are several combinations 1, 3, the direct current connection 18 is branched.

Furthermore, connected to the direct current connection 18 is yet another electrical line 28 which is particularly designed as 2-pole line and permits, via a switch 27 and a voltage transformer 26 as well as via an optional protection switch 25, to withdraw energy from an electrical energy store 19 (e.g., vehicle battery). Therefore, the operation of at least one of the machine inverters 23 is also possible with energy from the electrical energy store 19. Particularly when all internal combustion engines 1 are turned off, energy for starting the first internal combustion engine is taken from the electrical energy store 19 and used for starting at least one combination 1, 3. For example, the combination 1 a, 3a is started first, and then its electrical machine 3a operating as generator and the generated electrical energy fed into the link 8, 10 via the generator rectifier 5b. So it is available for the operation of at least one traction motor and optionally other consumers from the link.

Alternately or additionally, after the start of the combination 1 a, 3a, the energy generated by the electrical machine 3a can be fed in the direct current connection 18 via the associated machine inverter 23a and is available for the start of one or several other combinations 1, 3.

The voltage transformer 26 is also connected, via an electrical line, with line 10 on the higher potential of the link; namely via a resistance 29 and diode 30. The line 22 is separable from the voltage transformer 26 by switch 27. Via line 22, the direct current link (particularly the capacitance CD) can be precharged, i.e., a corresponding electric voltage can be generated between the line 10 and the line 8. This avoids very high electric currents when the generators 3 are connected by closing the switches 14.

Numerous modifications are possible to the arrangement illustrated in FIG. 1. For example, another number of combinations 1, 3 may be available. Alternately or additionally, several direct current links can be provided from which at least one traction motor each is supplied with electrical energy.

Again alternately or additionally, modifications can be made to the devices for feeding energy from the energy store 19 in the direct current connection 18, for example, at least one other voltage transformer can be connected in parallel with the voltage transformer 26 illustrated in Fig. E so that the energy store 19 can provide electrical energy optionally or simultaneously via one or several voltage transformers.

Figure 2:
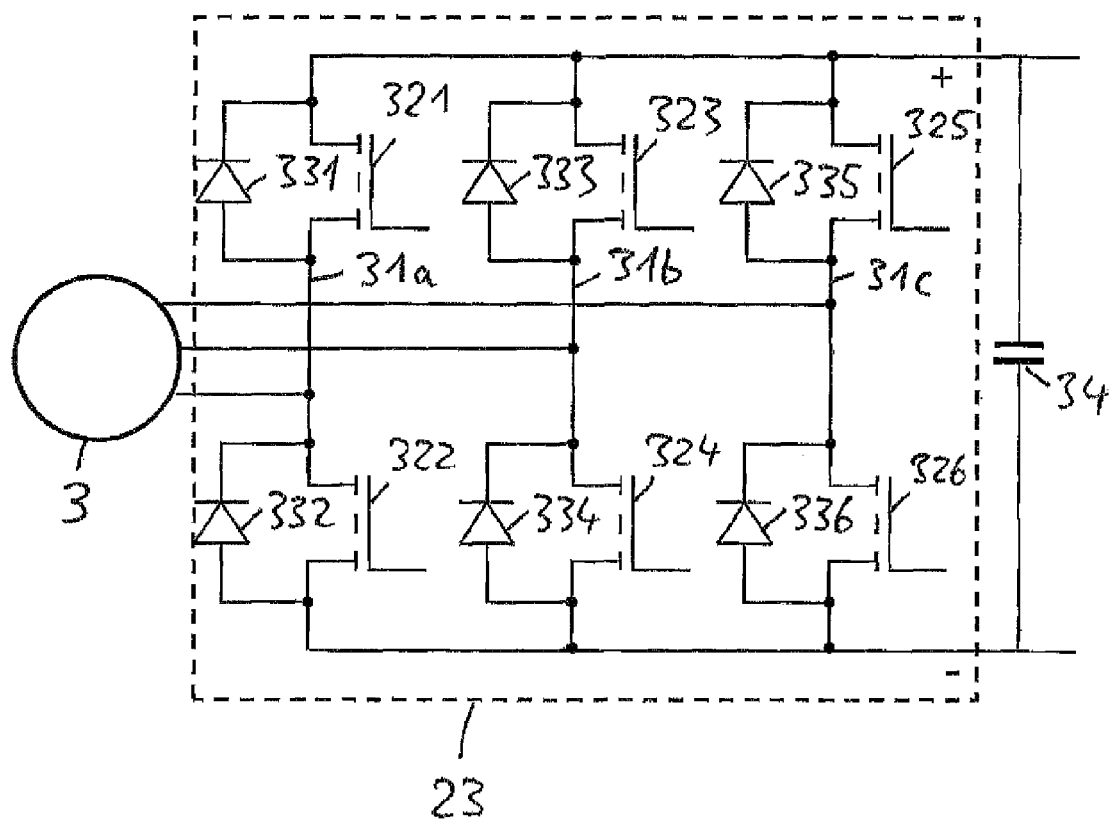

FIG. 2 illustrates another example of an embodiment for a machine power converter and a machine inverter, respectively, which may particularly be any of the machine inverters 23 illustrated in FIG. 1. Shown on the left in FIG. 2 is the associated electrical machine 3, the optionally available electrical switch 24 from FIG. 1 not shown in FIG. 2.

The electrical machine 3 is connected with the alternating current side of the machine power converter 23 via a three-phase electrical line illustrated as branch of line 4 in FIG. 1. The power converter 23 is composed of three half-bridges 31 a, 31 b, 31 c each of which is formed by a serial connection of two parallel connections each of a controllable electronic switch 321-326 and connected antiparallel with it as diode 331-336. Located in each half-bridge 31 a, 31 b, 31 c is the contact of the alternating voltage connection between the parallel connections connected in series.

The opposite ends of the half-bridges 31 each are taken to one of two common poles of the direct current connection, marked by a plus and a minus sign in FIG. 2. Connected between the poles and the different electrical potentials, respectively, is a capacitance 34. Furthermore, the two poles of the direct current connection are connected to a direct current connection via which the power converter 23 and preferably also other devices can be supplied with direct current, depending on the operating state in which the electrical machine is. According to the operating state, also the control of the electronic valves 321-326 (which are preferably IGBTs) is executed or not executed. Particularly the inverter operation of the power converter 23 is blocked (particularly then the electronic valves are all switched off) when there is no need to supply the electrical machine 3 with alternating current from the power converter 23. When, additionally, the electrical machine is in the operating state in which it supplies the power converter 23 with alternating current in order to supply the current rectified by the power converter 23 at least to one other internal combustion engine/machine combination, the alternating current is rectified due to the diodes 331-336 of the power converter 23 and according to the line-to-line alternating voltages of the three phases this yields a direct current at the direct current side of the power converter 23 the fluctuations of which are smoothed by the capacitance 34. In this operating state, the electrical potentials at the respective contacts of the alternating voltage connection of the power converter 23 are temporarily higher, in each period of the alternating current, than the electrical potentials at the positive pole of the direct current connection so that the diodes 331, 333, 335 become correspondingly conducting electrically. Conversely, the electrical potential at the alternating voltage contacts becomes temporarily lower than the electrical potential at the second pole of the direct current connection so that the diodes 332, 334, 336 become correspondingly conducting electrically.

In the following, preferred methods will be described particularly by the example of the arrangement according to FIG. 1. Therein, concrete examples of operating states (e.g., electrical voltages) will also be given, to which the methods are not limited, however. In practice, these electrical voltages and other electrical variables may vary or be selected differently.

In doing to, it is assumed that, at the direct current side of each of the machine power converters 23, a capacitance is integrated between the poles of the direct current connection, in which the capacitances chosen are preferably of the same size. So the capacitance totally available in the direct current connection of the machine power converters is at least as high as the number of the connected machine power converters multiplied by each capacitance. So substantial energy can be stored in the capacitances and is available for the mutual supply of the machine power converters. Besides, the smoothing of voltage fluctuations in the direct current connection is improved. Preferably, energy not only from the capacitances of the direct current connection is obtained for starting one of the internal combustion engines but, during the starting process, energy is fed into the direct current connection additionally from at least one of the other combinations.

In particular, due to the feeding of electrical energy by at least one of the electrical machines of the combinations, the voltage level in the direct current connection can be higher than when the direct current connection received energy exclusively from the energy store 19 of the vehicle.

For example, after closing the optional protection switch 25, the voltage level at the store side input of the voltage transformer 26 is approximately 110 V and the voltage transformer increases that voltage at its output to a voltage level of the order of 750 V. However, this increased voltage level is particularly lower than the later voltage level in the direct current connection 18 which is obtainable by feeding energy via one or several of the machine power converters 23. So starting processes or other supplies of the different combination 1, 3 among themselves can proceed at a higher voltage level and therefore faster and with higher energy flows than when supplied exclusively from the energy store of the vehicle. Particularly, therefore, all available combinations can be started faster and also more efficiently than when energy is exclusively obtained from the energy store 19.

If, for example, when a locomotive, for example, a diesel locomotive, is set up, the first internal combustion engine (particularly diesel engine) is to be started, the electrical switches 14 are opened and the electrical machines 3 are therefore still separated electrically from the direct current link 8, 10. Now preferably switch 27 is closed at first in order to connect the output of the voltage transformer 26 with the direct current connections of the machine power converters 23 and at the same time with the direct current link 8, 10. As mentioned before, the blocking diode 30 is installed in the electrical line 22 to protect from exceedingly high voltage after the start of the internal combustion engines when the link operates.

Now the at least one voltage transformer 26 can be switched on and, after switching on the optional protection switch 25, the energy store 19 and the voltage transformer 26, respectively, charge the capacitances CD in the link 8, 10 and the capacitances at the connections of the direct current connection 18 not shown in FIG. 1.

The charging of the capacitance CD protects the arrangement from exceedingly high currents which might occur after switching on at least one of the switches 14 if the capacitance was not pre-charged. Particularly also the direct current for charging the capacitances at the output of the voltage transformer 26 may initially be low and then be increased in the course of time.

Particularly when the voltage in the direct current link 8, 10 has attained a defined pre-set voltage, the starting process of a first internal combustion engines begins. For that, the switch 25 in the electrical line between the machine power converter 23 of the combination is closed and the machine power converter 23 is controlled such that an alternating voltage is generated at its alternating voltage side and an alternating current flows to the associated electrical machine 3. Previously or simultaneously the control of the internal combustion engine can be set into a state ready for starting.

Preferably the machine power converter 23 of the combination to be started is controlled such that the alternating current generated by it generates, in the associated electrical machine 3, a rotating field in the direction of rotation in which the coupled operation of the internal combustion engine and the electrical machine is to proceed. In doing so, the frequency of that alternating current is preferably increased in the course of time in order to cause the internal combustion engine at first to change from the state of rest to a moving state and then to accelerate. Preferably when a predefined minimum speed is attained or exceeded, the control unit of the internal combustion engine automatically starts the supply of fuel to the internal combustion engine causing the internal combustion engine itself to contribute to the further acceleration. Particularly when (another, higher) pre-defined speed level is attained or when it is exceeded, the motor inverter 23 is blocked, i.e., it does no longer generate alternating current. For that, the electronic switches are turned off permanently.

Latest at that time, the switch 27 can be opened again so that no further energy is obtained from the energy store 19. At the same time or alternately, the voltage transformer 26 is switched off.

The starting process continues in that the internal combustion engine automatically increases its speed further, particularly until an idling speed is obtained.

The first predefined speed value is, for example, at 120 revolutions a minute, the second predefined speed value, e.g., at 400 revolutions per minute, and the idling speed, e.g., approximately 600 revolutions per minute.

When the internal combustion engine increases its speed further after the associated machine inverter 23 has blocked, the alternating voltage generated by the associated electrical machine also increases. When the switch 24 remains closed or is closed, therefore, the electrical alternating voltage at the alternating voltage connection of the machine power converter increases and causes the electrical one-way valves (particularly the diodes 331-336 in FIG. 2) to become cyclically conducting so that the machine power converter 23 generates direct current at its direct voltage side. The appropriate electrical energy is now available for the further charging of the capacitances in the direct voltage connection and particularly, at the same time or later, for starting another internal combustion engine. By closing the appropriate electrical switch 24 and actuating the associated machine power converter 23, particularly in the same or a similar manner as described above, the internal combustion engine of the appropriate combination 1, 3 is started.

The electrical switches 14 can either be closed when all internal combustion engines have been started or when those combinations have been started which are intended for operation. After that starts the feeding of electrical energy from the respective electrical machines 3 via the closed switch 14 and the associated rectifier 5 in the direct current link 8, 10. Alternately at least one of the electrical switches 14 can already be closed earlier. This can happen particularly when the capacitance CD in the direct current link 8, 10 has been precharged and, for example, one or several of the combinations 1, 3 have already been started and generate electrical energy. However, alternately, this may also happen at an earlier time when the electrical alternating voltage generated by the electrical machine 3 of a started combination 1, 3 is still low, i.e., the speed of the internal combustion engine 1 is still low. In that case also, exceedingly high currents are prevented by charging the still empty capacitance CD.

Variations of the methods described above are possible. For example, depending on the respective operating state of the rail vehicle, it may suffice if only one of the combinations 1, 3 or only a part of the combinations 1, 3 feeds energy in the direct current link 8, 10. This is the case, for example, when only little energy is needed for the traction motors or even only other electrical consumers must be supplied with energy from the direct current link, e.g., consumers connected to a train power supply. In that case also, the switch 14 of the required combination 1, 3 can be closed. Particularly the switch 24 of the combination can also be open then.

Particularly depending on the operating state of the rail vehicle, if only a part of the combinations 1, 3 has already started, at least one other combination 1, 3 can again be started with energy from the energy store 19 and/or at least one still unstarted combination 1, 3 started with energy from a combination already started. In the last named case, with reference to the example of the embodiment of FIG. 1, the switch 24 of the combination already started and also the switch 24 of the combination to be started are closed and the machine power converter 23 of the combination to be started is supplied with direct current obtained from alternating current generated by the electrical machine of the already started combination. If another combination is started with energy from the energy store of the vehicle and if at least one other still unstarted combination is available, then that at least one other combination is preferably supplied with energy from a combination already started.

What is claimed is:

1. An arrangement for supplying electrical traction motors in a rail vehicle with electrical energy, the arrangement comprising:
    at least two internal combustion engines, each having an associated electrical machine for generating the electrical energy, in which the electrical machine is coupled mechanically to the internal combustion engine so that the electrical machine is driven by the internal combustion engine when the electrical machine is operating in a generator operation so that at least a first and a second internal combustion engine combination are formed,
    at least one electric traction connection by which a traction motor of the rail vehicle is connectable electrically with at least one of the electrical machines,
    at least two machine power converters, each associated with one of the electrical machines which supplies the electrical machine with electrical energy during a motor operation of the electrical machine, in which an alternating voltage connection of the machine power converter is connected with the electrical machine, and a control arrangement for controlling at least the operation of the machine power converters, and
    at least one generator rectifier for rectifying alternating currents generated by the electrical machines during generator mode of the respective electrical machine,
    in which the at least one generator rectifier is connected, at its alternating voltage side, with at least one of the electrical machines and, on its direct current side, with a direct current link through which the electrical traction motor is suppliable with electrical energy, and
    in which a first of the electrical machines is connected electrically with an alternating voltage connection of a rectifier, in which a direct current connection of the rectifier is connected electrically, via an electrical direct current line, with a direct current side of a second of the machine power converters associated with a second of the electrical machines, in which the rectifier rectifies the electrical alternating current generated by the first electrical machine and feeds the electrical alternating current generated by the first electrical machine, via the direct current line, to the second machine power converter, and the control arrangement is embodied so that the control arrangement operates the second machine power converter as an inverter in order to supply the second electrical machine with alternating current, while the second machine power converter is supplied with direct current from the rectifier.

2. The arrangement as claimed in claim 1 in which at least the first machine power converter is also operable as the rectifier and in which direct current connections of the machine power converter are connected electrically with each other via the electrical direct current line so that the first machine power converter rectifies the electrical alternating current generated by the first electrical machine associated with it and feeds it, through the electrical direct current line, to the second machine power converter.

3. The arrangement as claimed in claim 2, in which, anti-parallel with controllable electronic switches of the first machine power converter that enable the inverter function, at least one electrical one-way valve each is arranged so that the electrical one-way valves rectify the alternating current generated by the first electrical machine.

4. The arrangement as claimed in claim 1, in which at least one electrical capacitance is connected between the different electrical potentials of the direct current line and/or between the different electrical potentials of the direct current connection of the rectifier and/or a direct current connection of at least one of the machine power converters.

5. A method of supplying electrical traction motors in a rail vehicle with electrical energy, comprising:
    operating at least two internal combustion engines each in combination with an associated electrical machine so that at least a first and a second internal combustion engine/machine combination are operated,
    generating, by at least a first of the electrical machines, in a first operating state of the machine during a generator operation of the respective electrical machine driven by the internal combustion engine, alternating current that is used for the operation of at least one electrical traction motor,
    supplying at least a second of the electrical machines, in a second operating state of the machine, with alternating current from a machine power converter associated with the at least a second of the electrical machines and driving the internal combustion engine associated with the at least a second of the electrical machines,
    rectifying, in the first operating state of the electrical machine or the electrical machines, the generated alternating current by at least one generator rectifier provided additionally to the machine power converters, and
    feeding, in the first operating state of the electrical machine or the electrical machines, the generated alternating current into a direct current link from which the at least one electrical traction motor is su plied with electrical energy,
    in which at least the machine power converter associated with the second electrical machine, while the associated electrical machine is in the second operating state, is supplied with direct current, via an electrical direct current line, by a rectifier associated with the first electrical machine, in which the rectifier generates the direct current from alternating current generated by the first electrical machine.

6. The method as claimed in claim 5, further comprising the steps of:
    operating the first machine power converter as a rectifier so that the first machine power converter rectifies the alternating current generated by the first electrical machine associated with the first machine power converter and feeds it, via the electrical direct current line, to the second machine power converter.

7. The method as claimed in claim 5, further comprising the steps of:
    charging an electrical capacitance connected between the electrical potentials of the direct current line with electrical energy, and only after that, supplying at least one of the at least two electrical machines with inverted direct current from the direct current line and/or from the at least one capacitance.

* * * * *